United States Patent
Komljenovic et al.

(10) Patent No.: US 12,552,201 B2
(45) Date of Patent: Feb. 17, 2026

(54) PNEUMATIC TIRE

(71) Applicant: The Goodyear Tire & Rubber Company, Akron, OH (US)

(72) Inventors: Luka Komljenovic, Mentor, OH (US); Michael James Buckley, Kent, OH (US); Eder Abreu De Matos, São Paulo (BR)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 18/184,246

(22) Filed: Mar. 15, 2023

(65) Prior Publication Data
US 2024/0308274 A1  Sep. 19, 2024

(51) Int. Cl.
*B60C 11/00*  (2006.01)
*B60C 1/00*  (2006.01)
*B60C 19/08*  (2006.01)

(52) U.S. Cl.
CPC ............ *B60C 11/0066* (2013.01); *B60C 1/00* (2013.01); *B60C 11/0058* (2013.01); *B60C 19/082* (2013.01); *B60C 2001/0083* (2013.01)

(58) Field of Classification Search
CPC ............. B60C 11/0066; B60C 11/0058; B60C 19/082
See application file for complete search history.

(56) References Cited

U.S. PATENT DOCUMENTS

| | | | |
|---|---|---|---|
| 6,302,173 B1* | 10/2001 | Mizuno | B60C 1/0016 152/DIG. 2 |
| 9,352,615 B2 | 5/2016 | Djelloul-mazouz et al. | |
| 2002/0011295 A1* | 1/2002 | Denoueix | B60C 9/22 152/210 |
| 2004/0112490 A1* | 6/2004 | Sandstrom | B60C 11/005 152/209.5 |
| 2005/0167019 A1* | 8/2005 | Puhala | B60C 11/0058 152/209.4 |

(Continued)

FOREIGN PATENT DOCUMENTS

DE  10348760 A1 *  5/2005
EP  341187 A2 *  11/1989

(Continued)

OTHER PUBLICATIONS

Machine translation for Japan 2013-199154 (Year: 2023).*
Machine translation for German 10348760 (Year: 2023).*
Machine translation for Japan 2015-107776 (Year: 2024).*

*Primary Examiner* — Steven D Maki
(74) *Attorney, Agent, or Firm* — Eryn Ace Fuhrer; June E. Rickey

(57) ABSTRACT

The present invention relates to a pneumatic tire having a tread comprising a tread base layer and a tread cap. The tread cap comprises a first tread cap layer and a second tread cap layer of different polymeric compositions, the tread cap having a central cap zone $Z_C$ and two lateral cap zones $Z_L$ the lateral cap zones $Z_L$ being located axially adjacent to the central cap zone $Z_C$ and on axially opposite sides of the central cap zone $Z_C$.

4 Claims, 1 Drawing Sheet

(56) References Cited

U.S. PATENT DOCUMENTS

| | | | |
|---|---|---|---|
| 2009/0114321 A1* | 5/2009 | Nakamura | B60C 1/0016 152/152.1 |
| 2014/0041776 A1* | 2/2014 | Reinardt | B60C 11/0041 152/209.5 |
| 2015/0083293 A1* | 3/2015 | Zhao | B60C 1/0016 152/209.5 |
| 2019/0061425 A1* | 2/2019 | Broemmel | C08L 9/06 |

FOREIGN PATENT DOCUMENTS

| | | | |
|---|---|---|---|
| EP | 3208110 A1 | * | 8/2017 |
| EP | 3450205 A1 | | 3/2019 |
| JP | 2013-199154 A | * | 10/2013 |
| JP | 2015-107776 A | * | 6/2015 |

* cited by examiner

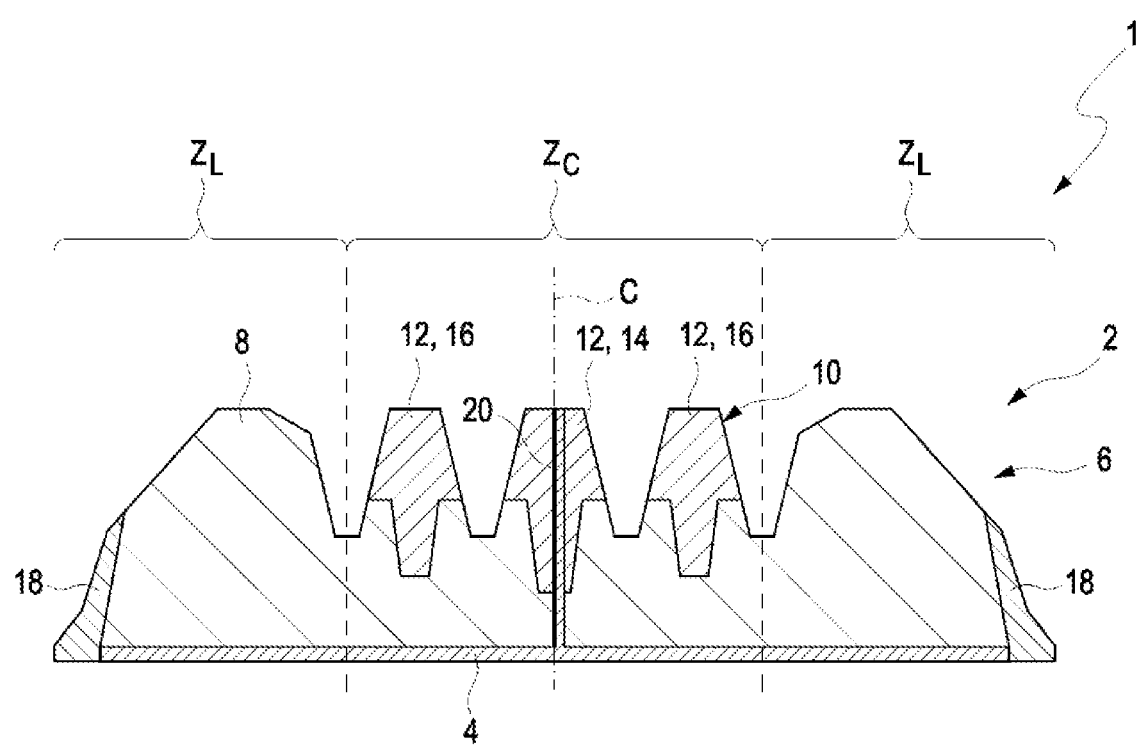

PNEUMATIC TIRE

FIELD OF THE INVENTION

The present invention relates to a pneumatic tire. More specifically, the present invention relates to the structure of a pneumatic tire for passenger vehicles such as cars but also trucks, buses, coaches and the like.

BACKGROUND OF THE INVENTION

In an effort to reduce vehicle emissions and to conserve fuel, there continues to be a long felt need to reduce rolling resistance of tires. However, any reduction of the tire's rolling resistance should desirably be accomplished in a manner that does not compromise performance characteristics.

EP 3 450 205 B1 describes a pneumatic tire comprising a tread describes a pneumatic tire comprising a tread, the tread comprising a radially outermost, ground contacting tread cap and a tread base disposed radially inward of and underlying the tread cap, the tread cap comprising a central cap zone and lateral cap zones, the lateral cap zones located axially adjacent to the central cap zone and on axially opposite sides of the central cap zone, the central cap zone comprising a first rubber composition and the lateral cap zones comprising a second rubber composition.

Despite the advantages provided by tires according to prior art, there is a continuing need for providing pneumatic tires with further reduced rolling resistance while still upholding or even increasing the quality in tire performance, such as stiffness and durability.

SUMMARY OF THE INVENTION

Therefore, the present invention relates to a pneumatic tire having a tread, the tread comprising
  a tread base layer;
  a tread cap comprising a first tread cap layer and a second tread cap layer formed of different polymeric compositions, the tread having a central zone $Z_C$ and two lateral zones $Z_L$ the lateral zones $Z_L$ being located axially adjacent to the central zone $Z_C$ and on axially opposite sides of the central zone $Z_C$,
wherein the first tread cap layer is arranged radially outward of the tread base layer and axially extends through the central zone $Z_C$ and both lateral zones $Z_L$,
wherein the second tread cap layer is arranged within the central zone $Z_C$ and radially outside of both the tread base layer and at least part of the first tread cap layer, wherein the second tread cap layer is not located within both lateral zones,
  wherein the tread further comprises a first rib located between a second and third rib, and wherein a first groove is located between the first and second rib and a second groove is located between the first and third rib, wherein each rib is formed of the first tread cap layer and the second tread cap layer,
and wherein the second tread cap layer has a first portion in the first rib that extends radially inward of the first and second grooves, and wherein the second tread cap layer has a second portion in the second rib that extends radially inward of the first and second grooves, and the second tread cap layer has a third portion in the third rib that extends radially inward of the first and second grooves, wherein the first portion extends radially inward of the second portion and the third portion.

Definitions

In the context of the present invention, the term "radially outside" means that in radial direction the distance between the radially outside layer and the tire's axis of rotation is greater than the distance between the radially inside layer and the tire's axis of rotation.

In the context of the present invention, the term "axially" refers to a direction that is parallel to the tire's axis of rotation.

In the context of the present invention, the term "rib" means a finger-like structure arranged circumferentially around the tire's axis of rotation, preferably having an at least partially flat or convex edge-segment of its cross section.

In the context of the present invention, the term "different" means physically different, preferably both chemically and physically different. Thus, different polymeric compositions are meant to be polymeric compositions that are physically different from each other, preferably both chemically different and physically different from each other.

BRIEF DESCRIPTION OF THE DRAWINGS

The invention will be described by way of example and with reference to the accompanying drawings in which:

FIG. 1 is a schematic cross-section of a tread of a pneumatic tire according to the present invention.

DETAILED DESCRIPTION OF THE INVENTION

The present invention relates to a pneumatic tire having a tread comprising
  a tread base layer;
  a tread cap comprising a first tread cap layer and a second tread cap layer of different polymeric compositions, the tread cap having a central cap zone $Z_C$ and two lateral cap zones $Z_L$ the lateral cap zones $Z_L$ being located axially adjacent to the central cap zone $Z_C$ and on axially opposite sides of the central cap zone $Z_C$,
wherein the first tread cap layer is arranged radially outside of the tread base layer and axially extends through the central cap zone $Z_C$ and both lateral cap zones $Z_L$,
wherein the second tread cap layer is arranged within the central cap zone $Z_C$ and radially outside of both the tread base layer and at least part of the first tread cap layer, wherein the second tread cap layer comprises at least three ribs at least partially extending radially inward, wherein a central rib of the at least three ribs extends further inward than two lateral ribs of the at least three ribs.

Preferably, the pneumatic tire further comprises two lateral skirt layers arranged axially adjacent to the tread base layer and the first tread cap layer and on axially opposite sides of the tread base layer and the first and second tread cap layers.

Preferably, the lateral skirt layers have a different composition than the tread base layer. Preferably, the lateral skirt layers comprises one or more polymers, such as elastomeric composition. Preferably, the lateral skirt layers have a different composition than the first tread cap layer. Preferably, the lateral skirt layers have a different composition than the second tread cap layer. More preferably, the lateral skirt layer, the tread base layer, the first tread cap layer and the second tread cap layer have different physical compositions. More preferably, the lateral skirt layer, the tread base layer, the first tread cap layer and the second tread cap layer have different physical and chemical compositions.

Preferably, the lateral skirt layers are arranged symmetrically about a center line C axially bisecting the tread.

Preferably, the lateral skirt layers are arranged asymmetrically about a center line C axially bisecting the tread.

Preferably, the central cap zone $Z_C$ is positioned axially symmetrically about a center line C axially bisecting the tread, and wherein both lateral cap zones $Z_L$ are positioned axially symmetrically with respect to each other about the center line C.

Preferably, the central cap zone $Z_C$ is positioned axially asymmetrically about a center line C axially bisecting the tread, and wherein both lateral cap zones $Z_L$ are positioned axially asymmetrically with respect to each other about the center line C.

The polymeric composition of the first tread cap layer can be any polymeric composition known by the skilled person to the extent that it is suitable for a tread cap layer in a pneumatic tire. Preferably, the polymeric composition of the first tread cap layer comprises one or more of an elastomer composition, silica and a silane coupling agent, such as a sulfur-containing organosilane, more preferably one or more of an elastomer composition and a silane coupling agent, more preferably an elastomer composition and a silane coupling agent.

Preferably, the polymeric composition of the first tread cap layer is a rubber composition.

Preferably, the central rib of the first tread cap layer is disposed axially symmetrically about a center line C axially bisecting the tread, and wherein the two lateral ribs are disposed axially symmetrically with respect to each other about the center line C.

Preferably, the central rib of the first tread cap layer is disposed axially asymmetrically about a center line C axially bisecting the tread, and wherein the two lateral ribs are disposed axially asymmetrically with respect to each other about the center line C.

Preferably, at least one of the ribs of the first tread cap layer have a cross-section composed of two trapezoids placed next to each other. Preferably, at least two of the ribs have a cross-section composed of two trapezoids placed next to each other. Preferably, all three of the ribs have a cross-section composed of two trapezoids placed next to each other. Preferably, the cross section composed of two trapezoids has rounded edges.

Preferably, the two trapezoids each have one pair of parallel sides, wherein the two trapezoids are placed next to each other, such that the longer one of the parallel sides of each trapezoids are arranged adjacently. Preferably, the two trapezoids of different shapes have one pair of parallel sides, wherein the two trapezoids are placed next to each other, such that the longer one of the parallel sides of each trapezoids are arranged adjacently.

Preferably, a bigger trapezoid cross section is arranged radially outside of a smaller trapezoid cross section. Preferably, a bigger trapezoid cross section having rounded edges is arranged radially outside of a smaller trapezoid cross section having rounded edges.

Preferably, a part of the at least one rib having a bigger trapezoid cross section protrudes radially outward, while a part of the at least one rib having a smaller trapezoid cross section extends radially inward into the second tread cap layer. Preferably, a part of the at least one rib having a bigger trapezoid cross section with longer parallel sides protrudes radially outward, while a part of the at least one rib having a smaller trapezoid cross section with shorter parallel sides extends radially inward into the second tread cap layer.

Preferably, a part of the two-trapezoid cross section protruding radially outward is the same for the central rib and the lateral ribs.

Preferably, a part of the two-trapezoid cross section extending radially inward is the same for both the lateral ribs. Preferably, a part of the two-trapezoid cross section extending radially inward into the second tread cap is the same for both the lateral ribs. Preferably, a part of the two-trapezoid cross section of the central rib extends further radially inward than the two-trapezoid cross section of the lateral ribs.

Preferably, the at least three ribs are configured for contacting ground at least with their outwards protruding parts when the tire is in use.

The polymeric composition of the second tread cap layer can be any polymeric composition known by the skilled person to the extent that it is suitable for a tread cap in a pneumatic tire. Preferably, the polymeric composition of the second tread cap layer comprises one or more of an elastomer composition, silica and a coupling agent.

Preferably, the polymeric composition of the first tread cap layer is a rubber composition.

Preferably, the second tread cap layer has a chemical and physical composition different to the first tread cap layer composition.

Preferably, the rebound at 23° C. of the polymeric composition of the first tread cap layer is higher than the rebound at 23° C. of the polymeric composition of the second tread cap layer.

Preferably, the tan delta (10%) at 100° C. of the polymeric composition of the first tread cap layer is lower than the tan delta (10%) at 100° C. of the polymeric composition of the second tread cap layer.

Preferably, the tan delta (10%) at 100° C. of the polymeric composition of the first tread cap layer is in the range of from 50 to 80%, more preferably from 60 to 75%, of the tan delta (10%) at 100° C. of the polymeric composition of the second tread cap layer.

Preferably, the stiffness of the polymeric composition of the first tread cap layer is higher than the stiffness of the polymeric composition of the second tread cap layer.

Preferably, the rolling resistance of the polymeric composition of the first tread cap layer is lower than the rolling resistance of the polymeric composition of the second tread cap layer.

Preferably, the stiffness of the tread cap is higher than the stiffness of the lateral skirt layers.

Preferably, the total rolling resistance impact of the lateral tread skirt layers is less than the total rolling resistance impact of the tread cap layers.

Preferably, the stiffness of the tread base is higher than the stiffness of the first tread cap layer and the stiffness of the tread base is higher than the stiffness of the second tread cap layer. Preferably, the second tread cap layer in each of the lateral cap zones $Z_L$ forms a shoulder configured for contacting ground when the tire is in use.

Preferably, the tread base layer comprises a polymeric composition comprising reinforcing wires embedded therein. Preferably, the tread base layer comprises a polymeric composition comprising reinforcing metal and/or textile, more preferably metal, wires embedded therein. The polymeric composition of the tread base layer can be any polymeric composition known by the skilled person to the extent that it is suitable for a tread base layer in a pneumatic tire. Preferably, the polymeric composition of the tread base layer is a rubber composition.

Preferably, the tread base layer comprises a chimney structure protruding through the first and second tread cap layer and configured for conducting static electrical charge. Preferably, the chimney structure interrupts the first tread cap layer that extends through the central cap zone $Z_C$ and both lateral cap zones $Z_L$.

Preferably, the chimney structure is arranged symmetrically about a center line C axially bisecting the tread.

Preferably, the chimney structure is arranged asymmetrically about a center line C axially bisecting the tread.

The different polymeric compositions of the tread base layer, first thread cap layer, second tread cap layer and lateral skirt layers can be any polymeric compositions as long as they are suitable for a tread base layer, a tread cap and lateral skirt layers, respectively, as well known in the art. The physical properties of said layers, such as stiffness and rolling resistance, can be adapted depending on the layers by the addition for example of one or more additives and/or fillers in the polymeric composition as well known by the skilled person in the art.

The present invention is further illustrated by the following set of embodiments and combinations of embodiments resulting from the dependencies and back-references as indicated. In particular, it is noted that in each instance where a range of embodiments is mentioned, for example in the context of a term such as "The pneumatic tire of any one of embodiments 1 to 3", every embodiment in this range is meant to be explicitly disclosed for the skilled person, i.e. the wording of this term is to be understood by the skilled person as being synonymous to "The pneumatic tire of any one of embodiments 1, 2 and 3". Further, it is explicitly noted that the following set of embodiments represents a suitably structured part of the general description directed to preferred aspects of the present invention, and, thus, suitably supports, but does not represent the claims of the present invention.

According to embodiment 1 of the present invention relating to a pneumatic tire having a tread, the tread comprises
a tread base layer;
a tread cap comprising a first tread cap layer and a second tread cap layer of different polymeric compositions, the tread cap having a central cap zone $Z_C$ and two lateral cap zones $Z_L$ the lateral cap zones $Z_L$ being located axially adjacent to the central cap zone $Z_C$ and on axially opposite sides of the central cap zone $Z_C$,
wherein the first tread cap layer is arranged radially outside of the tread base layer and axially extends through the central cap zone $Z_C$ and both lateral cap zones $Z_L$,
wherein the second tread cap layer is arranged within the central cap zone $Z_C$ and radially outside of both the tread base layer and at least part of the first tread cap layer, wherein the second tread cap layer comprises at least three ribs at least partially extending radially inward, wherein a central rib of the at least three ribs extends further inward than two lateral ribs of the at least three ribs.

Embodiment 2: The pneumatic tire of embodiment 1, further comprising two lateral skirt layers arranged axially adjacent to the tread base layer and the first tread cap layer and on axially opposite sides of the tread base layer and the first and second tread cap layers.

Embodiment 3: The pneumatic tire of embodiment 1 or 2, wherein the lateral skirt layers have a chemical and physical composition different to the tread base layer's composition, to the first tread cap layer's composition and to the second tread cap layer's composition.

Embodiment 4: The pneumatic tire of any one of embodiments 1 to 3, wherein the lateral skirt layers are arranged symmetrically about a center line C axially bisecting the tread.

Embodiment 5: The pneumatic tire of any one of embodiments 1 to 3, wherein the lateral skirt layers are arranged asymmetrically about a center line C axially bisecting the tread.

Embodiment 6: The pneumatic tire of any one of embodiments 1 to 5, wherein the central cap zone $Z_C$ is positioned axially symmetrically about a center line C axially bisecting the tread, and wherein both lateral cap zones $Z_L$ are positioned axially symmetrically with respect to each other about the center line C.

Embodiment 7: The pneumatic tire of any one of embodiments 1 to 5, wherein the central cap zone $Z_C$ is positioned axially asymmetrically about a center line C axially bisecting the tread, and wherein both lateral cap zones $Z_L$ are positioned axially asymmetrically with respect to each other about the center line C.

Embodiment 8: The pneumatic tire of any one of embodiments 1 to 7, wherein the polymeric composition of the first tread cap layer comprises one or more of an elastomer composition, silica and a silane coupling agent.

Embodiment 9: The pneumatic tire of any one of embodiments 1 to 8, wherein the polymeric composition of the first tread cap layer is a rubber composition.

Embodiment 10: The pneumatic tire of any one of embodiments 1 to 9, wherein the central rib of the first tread cap layer is disposed axially symmetrically about a center line C axially bisecting the tread, and wherein the two lateral ribs are disposed axially symmetrically with respect to each other about the center line C.

Embodiment 11: The pneumatic tire of any one of embodiments 1 to 9, wherein the central rib of the first tread cap layer is disposed axially asymmetrically about a center line C axially bisecting the tread, and wherein the two lateral ribs are disposed axially asymmetrically with respect to each other about the center line C.

Embodiment 12: The pneumatic tire of any one of embodiments 1 to 11, wherein at least one of the ribs of the first tread cap layer, preferably at least two, preferably all three of the ribs, have a cross-section composed of two trapezoids placed next to each other.

Embodiment 13: The pneumatic tire of embodiment 12, wherein at least one of the ribs of the first tread cap layer, preferably at least two, preferably all three of the ribs, have a cross-section composed of two trapezoids placed next to each other, the cross section having rounded edges.

Embodiment 14: The pneumatic tire of embodiment 12 or 13, wherein the two trapezoids, preferably of different shapes, each have one pair of parallel sides, wherein the two trapezoids are placed next to each other, such that the longer one of the parallel sides of each trapezoids are arranged adjacently.

Embodiment 15: The pneumatic tire of any one of embodiments 12 to 14, wherein a bigger trapezoid cross section is arranged radially outside of a smaller trapezoid cross section.

Embodiment 16: The pneumatic tire of any one of embodiments 12 to 15, wherein a part of the at least one rib having a bigger, preferably with longer parallel sides, trapezoid cross section protrudes radially outward, while a part of the at least one rib having a smaller, preferably with shorter parallel sides, trapezoid cross section extends radially inward into the second tread cap layer.

Embodiment 17: The pneumatic tire of any one of embodiments 12 to 16, wherein a part of the two-trapezoid cross section protruding radially outward is the same for the central rib and the lateral ribs.

Embodiment 18: The pneumatic tire of any one of embodiments 12 to 17, wherein a part of the two-trapezoid cross section extending radially inward, preferably into the second tread cap, is the same for both the lateral ribs.

Embodiment 19: The pneumatic tire of any one of embodiments 1 to 18, wherein the at least three ribs are configured for contacting ground at least with their outwards protruding parts when the tire is in use.

Embodiment 20: The pneumatic tire of any one of embodiments 1 to 19, wherein the polymeric composition of the second tread cap layer comprises one or more of an elastomer composition, silica and a coupling agent.

Embodiment 21: The pneumatic tire of any one of embodiments 1 to 20, wherein the polymeric composition of the first tread cap layer is a rubber composition.

Embodiment 22: The pneumatic tire of any one of embodiments 1 to 21, wherein the rebound at 23° C. of the polymeric composition of the first tread cap layer is higher than the rebound at 23° C. of the polymeric composition of the second tread cap layer.

Embodiment 23: The pneumatic tire of any one of embodiments 1 to 22, wherein the tan delta (10%) at 100° C. of the polymeric composition of the first tread cap layer is lower than the tan delta (10%) at 100° C. of the polymeric composition of the second tread cap layer.

Embodiment 24: The pneumatic tire of any one of embodiments 1 to 23, wherein the tan delta (10%) at 100° C. of the polymeric composition of the first tread cap layer is in the range of from 50 to 80%, preferably from 60 to 75%, of the tan delta (10%) at 100° C. of the polymeric composition of the second tread cap layer.

Embodiment 25: The pneumatic tire of any one of embodiments 1 to 24, wherein the stiffness of the polymeric composition of the first tread cap layer is higher than the stiffness of the polymeric composition of the second tread cap layer.

Embodiment 26: The pneumatic tire of any one of embodiments 1 to 25, wherein the rolling resistance of the polymeric composition of the first tread cap layer is lower than the rolling resistance of the polymeric composition of the second tread cap layer.

Embodiment 27: The pneumatic tire of any one of embodiments 2 to 26, as far as any one of embodiments 3 to 26 depends on embodiment 2, wherein the stiffness of the tread cap is higher than the stiffness of the lateral skirt layers.

Embodiment 28: The pneumatic tire of any one of embodiments 2 to 27, as far as any one of embodiments 3 to 27 depends on embodiment 2, wherein the total rolling resistance impact of the lateral tread skirt layers is less than the total rolling resistance impact of the tread cap layers.

Embodiment 29: The pneumatic tire of any one of embodiments 1 to 28, wherein the stiffness of the tread base is higher than the stiffness of the second tread cap layer.

Embodiment 30: The pneumatic tire of any one of embodiments 1 to 29, wherein the stiffness of the tread base is higher than the stiffness of the first tread cap layer.

Embodiment 31: The pneumatic tire of any one of embodiments 1 to 30, wherein the second tread cap layer in each of the lateral cap zones $Z_L$ forms a shoulder configured for contacting ground when the tire is in use.

Embodiment 32: The pneumatic tire of any one of embodiments 1 to 31, wherein the tread base layer comprises a polymeric composition comprising reinforcing wires embedded therein, preferably metal reinforcing wires; wherein the polymeric composition preferably is a rubber composition.

Embodiment 33: The pneumatic tire of any one of embodiments 1 to 32, wherein the tread base layer comprises a chimney structure protruding through the first and second tread cap layer and configured for conducting static electrical charge, preferably the chimney structure interrupts the first tread cap layer that extends through the central cap zone $Z_C$ and both lateral cap zones $Z_L$.

Embodiment 34: The pneumatic tire of any one of embodiments 1 to 33, wherein the chimney structure is arranged symmetrically about a center line C axially bisecting the tread.

Embodiment 35: The pneumatic tire of any one of embodiments 1 to 33, wherein the chimney structure is arranged asymmetrically about a center line C axially bisecting the tread.

In FIG. 1, a schematic cross-section of a tread of a pneumatic tire according to the present invention is illustrated. Specifically, the illustrated cross-section shows the tread of the pneumatic tire in an un-cured state. The pneumatic tire 1 comprises a tread 2, wherein the tread 2 comprises a tread base layer 4 and a tread cap 6. The tread cap 6 comprises a first tread cap layer 8 and a second tread cap layer 10 of different polymeric compositions. The tread cap 6 has a central cap zone $Z_C$ and two lateral cap zones $Z_L$. The lateral cap zones $Z_L$ are located axially adjacent to the central cap zone $Z_C$ and on axially opposite sides of the central cap zone $Z_C$. The first tread cap layer 8 is arranged radially outside of the tread base layer 4 and axially extends through the central cap zone $Z_C$ and both lateral cap zones $Z_L$. The second tread cap layer 10 is arranged within the central cap zone $Z_C$ and radially outside of both the tread base layer 4 and at least part of the first tread cap layer 8. Further, the second tread cap layer 10 comprises at least three ribs 12 at least partially extending radially inward, wherein a central rib 14 of the at least three ribs 12 extends further inward than two lateral ribs 16 of the at least three ribs 12.

Further, the tread 2 of the pneumatic tire 1 may comprise two lateral skirt layers 18 arranged axially adjacent to the tread base layer 4 and the first tread cap layer 8 and on axially opposite sides of the tread base layer 4 and both the first cap layer 8 and the second cap layer 10.

As exemplarily illustrated in FIG. 1, the lateral skirt layers 18 may be arranged symmetrically about a center line C of the pneumatic tire 1. Specifically, the center line C may be axially bisecting the tread 2 of the pneumatic tire 1. Alternatively, however, and as not shown in FIG. 1, the lateral skirt layers 18 may be arranged asymmetrically about the center line C of the pneumatic tire 1.

The tread base layer 10 may comprises a chimney structure 20 protruding through the first tread cap layer 8 and through the second tread cap layer 10. The chimney structure 20 may be configured for conducting static electrical charge. Preferably the chimney structure 20 may interrupt the first tread cap layer 8, specifically the first tread cap layer 8 that extends through the central cap zone $Z_C$ and both lateral cap zones $Z_L$.

In a cured state, the lines and/or borders within the tread illustrated in FIG. 1 may be blurred as known by the skilled person.

In FIG. 1, the legends are as below:
1: pneumatic tire
2: tread
4: tread base layer
6: tread cap
8: first tread cap layer
10: second tread cap layer
12: rib
14: central rib
16: lateral rib
18: skirt layer
20: chimney structure
C: center line
$Z_L$: lateral cap zone
$Z_C$: central cap zone.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A pneumatic tire having a tread comprising
a tread base layer;
a tread cap comprising a first tread cap layer and a second tread cap layer formed of different polymeric compositions,
the tread having a central zone $Z_C$ and two lateral zones $Z_L$ the lateral zones $Z_L$ being located axially adjacent to the central zone $Z_C$ and on axially opposite sides of the central zone $Z_C$,
wherein the first tread cap layer is arranged radially outward of the tread base layer and axially extends through the central zone $Z_C$ and both lateral zones $Z_L$,
wherein the second tread cap layer is arranged within the central zone $Z_C$ and radially outside of both the tread base layer and at least part of the first tread cap layer, wherein the second tread cap layer is not located within both lateral zones,
wherein the tread further comprises a first rib located between a second rib and third rib, and wherein a first groove is located between the first and second rib and a second groove is located between the first and third rib, wherein each rib is formed of the first tread cap layer and the second tread cap layer,
and wherein the second tread cap layer has a first portion in the first rib that extends radially inward of the first and second grooves, and wherein the second tread cap layer has a second portion in the second rib that extends radially inward of the first and second grooves, and the second tread cap layer has a third portion in the third rib that extends radially inward of the first and second grooves, wherein the first portion extends radially inward of the second portion and the third portion.

2. The pneumatic tire of claim 1, wherein the tread comprises a chimney structure positioned in the first rib and configured for conducting static electrical charge.

3. The pneumatic tire of claim 2, wherein the first rib is arranged symmetrically about a center line C axially bisecting the tread.

4. The pneumatic tire of claim 2, wherein the chimney structure is arranged asymmetrically about a center line C axially bisecting the tread.

* * * * *